United States Patent
Brabers

(10) Patent No.: US 7,132,831 B2
(45) Date of Patent: Nov. 7, 2006

(54) ELECTRODE CONFIGURATION FOR RESISTIVITY SOUNDING

(76) Inventor: Peteralv Brabers, Wintershovenstraat 8, Wintershoven (BE) B3722

( * ) Notice: Subject to any disclaimer, the term of this patent is extended or adjusted under 35 U.S.C. 154(b) by 0 days.

(21) Appl. No.: 10/813,621

(22) Filed: Mar. 31, 2004

(65) Prior Publication Data

US 2005/0218914 A1    Oct. 6, 2005

(51) Int. Cl.
*G01V 3/02* (2006.01)
*G01V 3/04* (2006.01)
*G01R 27/08* (2006.01)

(52) U.S. Cl. .................. 324/365; 324/357; 324/693; 324/713

(58) Field of Classification Search ........ 324/691–694, 324/697, 699, 713, 716, 334, 364–365, 347–348, 324/357–359, 370, 375
See application file for complete search history.

(56) References Cited

U.S. PATENT DOCUMENTS 2,531,088 A * 11/1950 Thompson ................ 324/365
4,246,538 A * 1/1981 Barker ..................... 324/347
4,298,840 A    11/1981 Bischoff et al.
4,617,518 A * 10/1986 Srnka ...................... 324/365
5,032,794 A * 7/1991 Ridd et al. ................ 324/365
5,587,659 A * 12/1996 Sørensen .................. 324/357
6,236,212 B1 * 5/2001 Wynn ....................... 324/365
6,636,046 B1 * 10/2003 Lee et al. .................. 324/347

* cited by examiner

*Primary Examiner*—Anjan Deb
*Assistant Examiner*—Jeff Natalini
(74) *Attorney, Agent, or Firm*—Browdy and Neimark, PLLC

(57) ABSTRACT

Device for resistivity soundings on water covered subsurfaces including a Fixed Current Asymmetric Schlumberger electrode configuration with a first and second current electrode and a number of voltage electrodes that are positioned on one line between the current electrodes, and method for measuring the apparent resistivity of water covered subsurfaces using said device and electrode configuration whereby a voltage gradient associated with a generated electrical field between the current electrodes, is measured between the voltage electrodes such that it allows noise recognition and noise filtering by Coupled Electrode Noise Filtering.

9 Claims, 1 Drawing Sheet

ELECTRODE CONFIGURATION FOR RESISTIVITY SOUNDING

FIELD OF THE INVENTION

The present invention relates to a method for resistivity surveys on water, i.e. for measuring of apparent resistivity of water covered subsurfaces using a multi-channel cable carrying an electrode array. In particular the present invention relate, to a new electrode configuration and a method for noise recognition and noise filtering as used in quantitative resistivity applications involving inversion of resistivity data into true depth sections.

BACKGROUND OF THE INVENTION

Resistivity sounding is a well known geophysical method used in geological applications on land as well as on water. Although the method is generally well accepted for land applications it tends to be less successful in applications on water requiring for instance accurate determination of depths and thicknesses of sea and river sediments and other geological structures.

Many existing electrode configurations have been derived from the "Normal Schlumberger" electrode configuration as originally developed for resistivity sounding on land in which an electrical current is injected into the subsurface by means of two current electrodes. The voltage gradient associated with the electrical field of this current is measured between two voltage electrodes placed in between tie current electrodes. Based on the measured values of current and voltage, the average resistivity of the subsurface is calculated for a subsurface volume down to a certain penetration depth. The penetration depth depends on the distance between the current electrodes and the center point between the voltage electrodes. Larger electrode distances arc associated with increasing penetration depths.

In order to obtain information from progressively deeper geological structures the current electrodes are consecutively shifted while the voltage electrodes remain fixed and the measurements are repeated with progressively increasing current electrode distances. As such, a field curve is obtained showing resistivity as function of the distance between the current electrodes.

The resistivity of a geological structure depends on e.g. its porosity, water saturation and water resistivity. For instance, gravel has usually a lower porosity than sand and thus a higher resistivity, clay generally has very high porosities and thus shows very low resistivities, and solid rock has a low porosity and thus shows very high resistivities. Accordingly, every geological structure has its own specific resistivity.

Resistivity surveys on water are carried out using either a floating cable or a bottom towed cable carrying electrodes in a well defined configuration. For these resistivity surveys on water several electrode configurations are currently used comprising a pair of current electrodes and multiple voltage electrodes.

A commonly used configuration is the dipole-dipole electrode configuration using a pair of current electrodes and several pairs of voltage electrodes located outside the current electrodes. An example of such an electrode array is described in U.S. Pat. No. 4,298,840 (Bischoff et al., Nov. 3, 1981). This patent also discloses a manner to construct the electrodes. The dipole-dipole configuration is known to be very sensitive to lateral subsurface variations and is therefore less appropriate for applications involving inversion of apparent resistivity data into true resistivity depth sections.

One of the currently most commonly used configurations is the "Asymmetric Inverse Schlumberger" configuration where the voltage electrodes are located outside the current electrode pair.

During the sounding, an electrical current is injected between the current electrodes and simultaneously the electric field is measured between one of the voltage electrodes and one of the other voltage electrodes located at the opposite side of the pair of current electrodes. The penetration depth is gradually increased from the voltage electrode closest to the current electrodes towards the voltage electrode most remote from the current electrodes.

Compared to the "Normal Schlumberger" configuration the "Asymmetric Inverse Schlumberger" configuration offers the advantage that resistivity soundings can be carried out much faster because the current injection electrodes remain the same throughout the sounding.

However, the "Asymmetric Inverse Schlumberger" configuration has also a number of disadvantages. The minimum distance that a voltage electrode pair can approach the distorted electrical field in the immediate surroundings of the current electrodes is determined by the ratio defined by the distance between both current electrodes divided by their average distance from the nearest voltage electrode. If this ratio is chosen too large the electrical gradient can not be considered linear. A very low ratio on the other hand results in very high geometrical factors and thus very poor signal/noise ratios. As a high signal/noise ratio is essential for apparent resistivity data to be successfully inverted into true resistivity depth sections, the "Asymmetric Inverse Schlumberger" configuration, which may be appropriate in qualitative applications involving simple apparent resistivities and/or formation factors, is generally less successful in quantitative resistivity applications involving inversion into sediment depths and thicknesses.

BRIEF SUMMARY OF THE INVENTION

One of the main aims of the present invention is to provide an electrode configuration for measuring apparent resistivities of watercovered subsurfaces resulting in reduced noise levels and more accurate inverted resistivity depth sections.

This can be obtained by the method and device as represented in the claims added hereto.

Thus, the method, according to the invention, includes the following steps: (i) towing a multi-channel cable along a water covered subsurface, whereby said cable has an array of electrodes comprising two current electrodes and a number of voltage electrodes located between the current electrodes, (ii) generating an electrical field between the current electrodes by injecting an electrical current, (iii) measuring a voltage gradient associated with the generated electrical field between pairs of voltage electrodes, and (iv) calculating the resistivity as a function of depth beneath the water covered subsurface.

Advantageously, one of the current electrodes, i.e. the far current electrode, is positioned more remote from the voltage electrodes than the other current electrode, i.e. the nearest current electrode. Further, the distance between two electrodes, forming a pair of voltage electrodes, varies along the cable such that the distance between the electrodes of a pair of voltage electrodes situated close to said nearest current electrode is smaller than the distance between the electrodes of a pair of voltage electrodes that is more remote from this nearest current electrode. Accordingly, as the distance from said nearest current electrode increases, the distances between electrodes of successive pairs of voltage electrodes also increase. As this keeps geometrical factors low, it tends to improve signal/noise ratios of the measurements.

More advantageously, a voltage gradient is measured between at least two pairs of voltage electrodes coupled through a common voltage electrode. This offers the possibility to detect and correct noise on the common voltage electrode by smoothing the apparent resistivity curve, i.e. the (apparent) resistivity as function of depth beneath the water covered subsurface, taking into account the opposite effect of this noise on the resistivity values measured between pairs of voltage electrode having the noisy voltage electrode in common.

Further the invention also provides a device for resistivity soundings on water covered subsurfaces comprising a multi-channel cable with an array of electrodes including two current electrodes and a number of voltage electrodes located in between the current electrodes.

As such the present invention a to improve quantitative resistivity sounding applications on water by the use of an "Asymmetric Schlumberger" array with fixed current electrodes and voltage electrodes placed in between the current electrodes.

This array, according to the invention, will be referred to as "Fixed Current Asymmetric Schlumberger" electrode configuration (FCAS).

BRIEF DESCRIPTION OF THE DRAWINGS

Other details and particularities of the invention will become clear from the following description in which is represented a particular embodiment of a device for applying the method of the invention, as an example only without being limitative in any way, with reference to the accompanying drawing, in which.

DETAILED DESCRIPTION OF THE INVENTION

Figure 1:
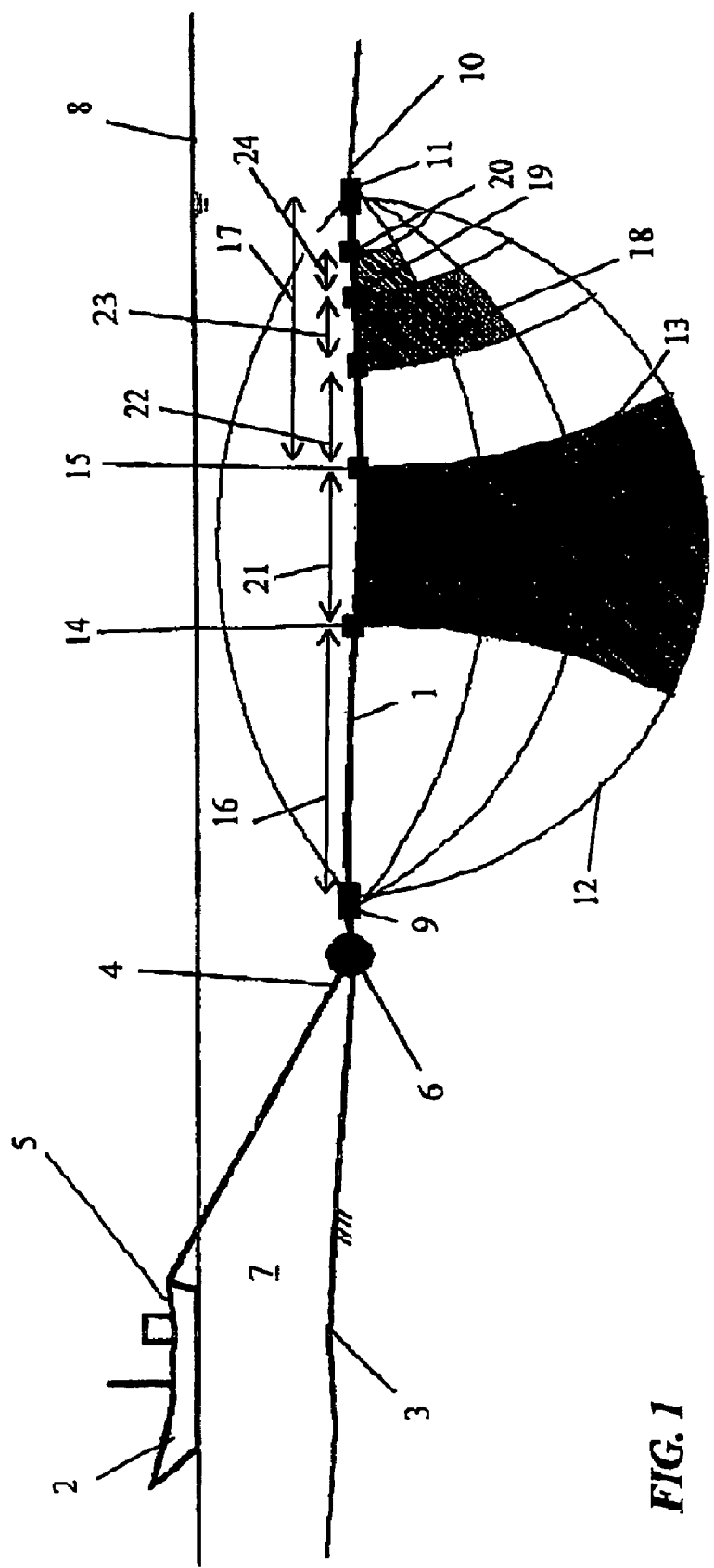
FIG. 1 is a schematic representation of a vessel with a towed cable according to an embodiment of the invention having current and voltage electrodes arranged in a "Fixed Current Asymmetric Schlumberger" electrode configuration (FCAS).

The invention relates to a method for measuring high quality apparent resistivities of water covered subsurfaces which can be used for inversion into true vertical depth sections.

Resistivity of the upper soils of a water bed is determined by measuring a voltage gradient associated with an electrical field of an electrical current that is injected into the subsurface.

To this end, a substantially flexible multi-channel cable 1 with an array of electrodes, according to an embodiment of the invention, is towed by a survey vessel 2 along the water covered subsurface 3 as represented schematically in FIG. 1. This water covered subsurface or water bed 3 can be for instance a sea bed or river bed.

The electrodes are arranged separated from each other in the following fixed order from a first end 4 towards a second end 10 of the cable 1: (i) a first current electrode 9, (ii) a first voltage electrode 14, (iii) a second voltage electrode 15, (iv) a third voltage electrode 18, (v) a fourth voltage electrode 19, (vi) a fifth voltage electrode 20 and (vii) finally a second current electrode 11.

The first current electrode 9, provided near the first end 4 of the cable 1, and the second current electrode 11, provided near the second end 10 of the cable 1 are each individually connected with a current input, control and measuring device 5 on the vessel 2 by a separate insulated electrical lead of the multi-channel cable 1.

The cable 1 is fixed at the first end 4 to the vessel 2. A cable weight 6 can be provided between the first end 4 of the cable 1 and the electrodes in order to maintain the cable 1 on the water bed 3. Depending on the actual conditions the cable can also be floating on the water surface 8, or towed at a certain depth in the water body 7, in between the water surface 8 and the water covered subsurface 3.

The first current electrode 9, which is also the far current electrode or the electrode which is showing the largest distance from the other electrodes, can be located on the water bed 3, at the water surface 8 or somewhere in between.

A possible variation could be defined by inverting the electrode sequence taking electrode 11 at the end 10 closer to the survey vessel 2. This means that the cable 1 is fixed at the second end 10 to the vessel 2 in stead of at the first end 4.

According to another variation, one of the current electrodes 9 or 11 could be positioned somewhere higher up in the water column between the subsurface 3 and the survey vessel 2.

An electrical current is injected between the first and the second current electrodes 9 and 11. The generated electrical field between the current electrodes 9 and 11 is represented schematically by current lines 12 and corresponding equipotential planes 13.

The corresponding voltage gradient is measured between pairs of neighboring voltage electrodes that are located in the generated electric field on the cable 1 between the current electrodes 9 and 11.

Each of the voltage electrodes is individually electrically connected to the control and measuring device 5 on the vessel 2 by a separate insulated electrical lead of the multi-channel cable 1.

A first pair is formed by a first and a second voltage electrode 14 and 15 whereby the distance 16 between the first voltage electrode 14 and the first current electrode 9 is the same as or is larger than the distance 17 between the second voltage electrode 15 and the second current electrode 11.

A third, fourth and fifth voltage electrode 18, 19 and 20 are located between the second voltage electrode 15 and the second current electrode 11.

Further pairs of neighboring voltage electrodes are formed by the voltage electrodes 15 and 18, 18 and 19, 19 and 20, respectively. A voltage gradient is measured between these pairs. Naturally more voltage electrode pairs can be added.

In order to keep geometrical factors low and thus signal/noise ratios high while maintaining the linearity of the measured voltage gradients, the distance between the voltage electrodes of each pair of voltage electrodes decreases from the first end 4 of the cable 1 towards the second end 10 of the cable 1. This means that the distance 21 between the first and second voltage electrodes 9 and 11 is larger than the distance 22 between the second and third voltage electrodes 11 and 18, which in turn may be larger that the distance 23 between he third and fourth voltage electrodes 18 and 19, which in turn may be larger than the distance 24 between the fourth and fifth voltage electrodes 19 and 20.

The penetration depth depends mainly on the distance between the voltage electrodes 14, 15, 18, 19 and 20 and the second current electrode 11 and to a lesser extent on the distance from the first, more remote, current electrode 9.

Optimally, the average distances between the voltage electrode pairs and the second current electrode 11 decrease exponentially.

Furthermore, means, known to the man skilled in the art, are provided for determining the exact position of each of the electrodes in order to be able to correlate measurements to the exact position on the water bed.

From data obtained by measurements according to the invention, it is known to the man skilled in the art to further calculate the resistivity as a function of depth beneath the water bed.

The fact that the different resistivity measurements of the same apparent resistivity curve are shifted laterally relative to one another can be accounted for by repeating the measurements as the cable is moving over the water bed and interpolating the resistivity values on to the same horizontal location.

While the survey vessel is sailing, the measurements are carried out and stored automatically without any intervention from the operator. As such, an entire electrical sounding may be obtained every three seconds. At a boat speed of one meter per second this corresponds to a horizontal resolution of one complete sounding every three meters. In applications concerning i.e. the exploration of alluvial diamonds this resolution may be needed to detect even the smaller diamond bearing "potholes" and buried channels.

The time of measurement is stored with each single resistivity measurement and allows synchronizing the resistivity data with the positioning data (DGPS) and possibly additional bathymetric information (echo sounder) and tidal information. Alternatively positioning and bathymetric equipment can be interfaced on-line with the resistivity equipment.

The raw data are subject to a series of processing steps and are presented as profiles beneath the water bed and plan three dimensional horizontal resistivity sections which accurately delineate small scale changes in sediment properties within the watercovered subsurface.

After interpolation of the resistivity information into regular grid vertical cross-sections, 3D representations of the subsurface are obtained. The results may be visualized on cross sections showing the different geological structures in function of depth and geographical position. The results may also be calibrated with information from a limited number of boreholes in order to verify and sample each geological structure.

If sufficient lines have been sailed in the same zone or river section a three-dimensional model of the subsurface may be constructed. Across such a model vertical and horizontal cross sections may be traced in all possible directions and levels.

The FCAS electrode configuration, according to the invention, has the advantage that the distances between the neighboring voltage electrodes 14 and 15, 15 and 18, 18 and 19, 19 and 20 are variable throughout the apparent resistivity curve. In this way geometrical factors are rather small resulting in better signal/noise ratios.

For shallow measurements beneath the water bed, e.g. up to 0.4 meters beneath the water covered subsume, the distance 24 is small, e.g. 0.30 to 0.45 meters, between voltage electrodes 19 and 20 located in the area closest to the nearest current electrode 11 associated with the largest voltage gradients, e.g. from 100 to 300 mV on soft seabed sediments.

For deeper measurements, e.g. up to 15 meters beneath the water bed, the distance 21 is relatively large, e.g. 15 to 20 meters, between the more remote voltage electrodes, i.e. the first and second voltage electrode 14 and 15, and more suitable for measuring the smallest voltage gradients, e.g. from 10 to 15 mV, further away from the nearest current electrode.

The present electrode configuration significantly helps in reducing noise levels. These low noise levels are very essential for the inversion of apparent resistivity curves in order to provide correct information about depths, thicknesses and nature of sediments.

Compared to existing geo-electrical systems, the FCAS electrode configuration, according to the invention, results in e.g. a significant increase of the vertical resolution of inverted resistivity data.

The use of the FCAS array, according to the invention, offers the possibility of measuring voltage gradients simultaneously between two neighbouring voltage electrodes pairs having a voltage electrode in common. Noise on the common electrode will have an effect with opposite sign on the apparent resistivities measured simultaneous between two adjacent electrode pairs having this noisy electrode in common. As such it can be recognized and removed manually or statistically by changing both resistivities related to both neighboring electrode pairs proportionately until a smooth apparent resistivity curve is reached.

This noise removal method, according to the present invention, will be referred to as "Coupled Electrode Noise Filtering" (CENF).

From the explanations above it is clear that consecutively deeper penetrating measurements are carried out between neighboring voltage electrode pairs such as e.g. the pair 18 and 19 and the pair 19 and 20. This means that noise on the common electrode 19 will result in a noise voltage, both on the pair 18 and 19 as well as on the pair 19 and 20, but with opposite signs. In short, the electrode pair 18 and 19 and the pair 19 and 20 are not independent from one another; they are coupled to one another thanks to the common electrode 19.

The fact that noise on one of the electrodes thus causes on two consecutive voltage electrode pairs a deviation from the smoothed apparent resistivity curve with an opposite sign offers the opportunity (i) to identify this noise and (ii) to correct it either manually or statistically.

This operation according to the invention is carried out as follows.

Suppose K1 and s1 are the geometrical factor and noise induced error related to the first resistivity value corresponding to a first pair of adjacent voltage electrodes and K2 and s2 the geometrical factor and noise induced error related to the second resistivity value associated with a second pair of adjacent voltage electrodes. These pairs of voltage electrodes have one electrode in common such that there exists a fixed relation between the resistivity noise s1 sand s2 namely $$s2 = -s1 \times K1/K2$$

Accordingly, it suffices to change only one of the resistivity values in order to know the effect on the second resistivity value. Subsequently, both resistivity values are connected such that they fit on a smooth apparent resistivity curve.

Thus, the FCAS array and CENF lead to significant improvement of quantitative resistivity sounding applications on water.

Naturally, the invention is not restricted to the method and the embodiment described above and to the embodiment represented in the accompanying drawing; on the contrary, a number of other variants are possible, in particular as far as the number of voltage electrodes used for measuring of the voltage gradient is concerned. Other variations are possible inverting the electrode sequence or placing the far current electrode higher up in the water column either on the same multi-channel cable or on a separate cable; or on an analogous device for maintaining the electrodes in a fixed position.

What is claimed is:

1. Device for resistivity soundings on water covered subsurfaces (3) comprising a multi-channel towing cable (1), which tows along a water covered subsurface (3), with an array of electrodes including a first current electrode (9), a second current electrode (11) and at least three voltage electrodes positioned between the first and second current electrodes (9, 11), whereby neighboring voltage electrodes (14 and 15, 15 and 18, 18 and 19, 19 and 20) are separated from each other by distances (21, 22, 23, 24) along the cable (1) that decrease from the first current electrode (9) towards the second current electrode (11), whereby the first current electrode (9) is separated from a neighboring first voltage electrode (14) by a distance (16) that is at least equal to the distance (17) between the second current electrode (11) and a second voltage electrode (15) that is located between the first voltage electrode (14) and the second current electrode (11) and, whereby further voltage electrodes (18, 19, 20) are located between the second voltage electrode (15) and the second current electrode (11), whereby the voltage electrodes (14, 15, 18, 19 and 20) are connected to each other such that a voltage gradient can be measured across at least two pairs of neighboring voltage electrodes (14 and 15, 15 and 18, 18 and 19, 19 and 20) forming pairs of neighboring voltage electrodes having one voltage electrode (15, 18, 19) in common.

2. Device according to claim 1, whereby the first current electrode (9) is located nearby a first end (4) of the cable (1) that is connected to a vessel (2).

3. Device according to claim 1, whereby the second current electrode (11) is located nearby a second end (10) of the cable (1) that is connected to a vessel (2).

4. Method for measuring the apparent resistivity of water covered subsurfaces including the steps of (i) towing a multi-channel cable (1) along the water covered subsurface (3), whereby said cable (1) has an array of electrodes comprising a first current electrode (9), a second current electrode (11), and a number of voltage electrodes (14, 15, 18, 19, 20) located between the current electrodes (9, 11), (ii) generating an electrical field (12, 13) between the current electrodes (9, 11) by injecting an electrical current, (iii) measuring of a voltage gradient associated with the generated electrical field (12, 13) between at least two pairs of neighboring voltage electrodes (14 and 15, 15 and 18, 18 and 19, 19 and 20) that are coupled through a common voltage electrode (15, 18, 19), whereby the neighboring voltage electrodes (14 and 15, 15 and 18, 18 and 19, 19 and 20) are being separated from each other by a distance (21, 22, 23, 24) that decreases from the first current electrode (9) towards the second current electrode (11), (iv) calculating the resistivity as a function of depth beneath the water covered subsurface, whereby noisy apparent resistivity curves, resulting from voltage measurements between the common voltage electrode (15, 18, 19) and two neighboring voltage electrodes (14, 15, 18, 19, 20) due to noise on the common voltage electrode (15, 18, 19), are corrected in accordance with adjacent resistivities in order to obtain a smooth apparent resistivity curve.

5. Method for measuring the apparent resistivity of water covered subsurfaces including the steps of (i) towing a multi-channel cable (1) along the water covered subsurface (3), whereby said cable (1) has an array of electrodes comprising a first current electrode (9), a second current electrode (11), and a number of voltage electrodes (14, 15, 18, 19, 20) located between the current electrodes (9, 11), (ii) generating an electrical field (12, 13) between the current electrodes (9, 11) by injecting an electrical current, (iii) measuring of a voltage gradient associated with the generated electrical field (12, 13) between at least two pairs of neighboring voltage electrodes (14 and 15, 15 and 18, 18 and 19, 19 and 20) that are coupled through a common voltage electrode (15, 18, 19), whereby the neighboring voltage electrodes (14 and 15, 15 and 18, 18 and 19, 19 and 20) are being separated from each other by a distance (21, 22, 23, 24) that decreases from the first current electrode (9) towards the second current electrode (11), (iv) calculating the resistivity as a function of depth beneath the water covered subsurface, whereby noise on the common voltage electrode (15, 18, 19), resulting in deviated voltage measurements at two pairs of voltage electrodes (14 and 15, 15 and 18, 18 and 19, 19 and 20) coupled through the common voltage electrode (15, 18, 19), is removed by compensating the measurements according to the following equation $$s2 = -s1 \times K1/K2$$

where K1 and s1 are the geometrical factor and the resistivity noise related to a first resistivity value obtained by measuring the voltage gradient between the first pair of voltage electrodes (14 and 15, 15 and 18, 18 and 19, 19 and 20), and K2 and s2 are the geometrical factor and the resistivity noise related to the second resistivity value obtained by measuring the voltage gradient between the second pair of voltage electrodes (14 and 15, 15 and 18, 18 and 19, 19 and 20).

6. Method according to claim 4 or 5, whereby the cable (1) is towed by a vessel (2) substantially parallel to the water covered subsurface, such that the first current electrode (9) is located nearby the vessel (2) and the second current electrode (11) is located remote from the vessel (2).

7. Method according to claim 4 or 5, whereby a first voltage electrode (14) is located at a distance (16) from the first current electrode (9) that is at least equal to the distance (17) between the second current electrode (11) and a second voltage electrode (15) that is located between the first voltage electrode (14) and the second current electrode (11), and whereby further voltage electrodes (18, 19, 20) are located between the second voltage electrode (15) and the second current electrode (11).

8. Method according to claim 4 or 5, whereby a voltage gradient is measured between pairs of neighboring voltage electrodes (14 and 15, 15 and 18, 18 and 19, 19 and 20).

9. Method for measuring the apparent resistivity of water covered subsurfaces including the steps of
- (i) towing a multi-channel cable (1) substantially parallel to the water bed (3), whereby said cable (1) has an array of electrodes comprising a first current electrode (9), a second current electrode (11) and at least three voltage electrodes (14, 15, 18, 19, 20) located in between the current electrodes (9, 11), whereby the first current electrode (9) is positioned more remote from the voltage electrodes (14, 15, 18, 19, 20) than the second current electrode (11), such that the first current electrode (9) is located at a distance (16) from a first voltage electrode (14) that is at least equal to the distance (17) between the second current electrode (11) and a second voltage electrode (15) that is located between the first voltage electrode (14) and the second current electrode (11), whereby further voltage electrodes (18, 19, 20) are located between the second voltage electrode (15) and the second current electrode (11), whereby neighboring voltage electrodes (14 and 15, 15 and 18, 18 and 19, 19 and 20) are being separated from each other by a distance (21, 22, 23, 24) that decreases from the first current electrode (9) towards the second current electrode (11),
- (ii) generating an electrical field (12, 13) between the current electrodes (9, 11) by injecting an electrical current,
- (iii) measuring a voltage gradient associated with the generated electrical field (12, 13) between at least two pairs of voltage electrodes (14, 15, 18, 19, 20), whereby the distance (21, 22, 23) between the voltage electrodes of a first pair of neighboring voltage electrodes is larger than or equal to the distance (22, 23, 24) between the voltage electrodes of a second pair of neighboring voltage electrodes located closer to the second current electrode (11) and whereby the pairs of neighboring voltage electrodes (14 and 15, 15 and 18, 18 and 19, 19 and 20) are coupled through a common voltage electrode (15, 18, 19),
- (iv) calculating the resistivity as a function of depth beneath the water covered subsurface.

* * * * *